United States Patent
Lang et al.

(10) Patent No.: US 10,694,663 B2
(45) Date of Patent: Jun. 30, 2020

(54) FILAMENT CUTTING HEAD FOR A TRIMMER

(71) Applicant: ANDREAS STIHL AG & CO. KG, Waiblingen (DE)

(72) Inventors: Sven Lang, Baltmannsweiler (DE); David Günther, Kernen im Remstal (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 80 days.

(21) Appl. No.: 15/975,292

(22) Filed: May 9, 2018

(65) Prior Publication Data

US 2018/0325023 A1 Nov. 15, 2018

(30) Foreign Application Priority Data

May 9, 2017 (EP) .................................... 17000792

(51) Int. Cl.
*A01D 34/412* (2006.01)
*A01D 34/416* (2006.01)

(52) U.S. Cl.
CPC ..... *A01D 34/4166* (2013.01); *A01D 34/4165* (2013.01); *A01D 34/4167* (2013.01)

(58) Field of Classification Search
CPC ............ A01D 34/412–42; A01D 34/46; A01D 34/49; A01D 34/52–62
USPC ...................................... 30/276; 56/12.7, 17
See application file for complete search history.

(56) References Cited

U.S. PATENT DOCUMENTS

| 4,461,138 A | * | 7/1984 | Whitman | A01D 34/4166 56/12.7 |
| 5,023,998 A | * | 6/1991 | Masciarella | A01D 34/4165 30/276 |
| 5,048,278 A | * | 9/1991 | Jones | A01D 34/4166 30/276 |
| 5,758,424 A | * | 6/1998 | Iacona | A01D 34/4166 30/276 |
| 5,887,348 A | * | 3/1999 | Iacona | A01D 34/4166 30/276 |

(Continued)

FOREIGN PATENT DOCUMENTS

| DE | 102014006057 A1 | 10/2015 | |
| EP | 1967059 A1 | 9/2008 | |
| EP | 3400776 A1 * | 11/2018 | ......... A01D 34/4165 |

*Primary Examiner* — Jason Daniel Prone

(74) *Attorney, Agent, or Firm* — Lucas & Mercanti, LLP; Klaus P. Stoffel

(57) ABSTRACT

A rotatingly drivable filament cutting head for a trimmer, having a basic body on which a cutting filament is held. The cutting filament extends from outside the basic body through an opening into an interior region of the filament cutting head open to the surrounding area. A stop is arranged on the filament cutting head, so that, in a first position of the cutting filament, the stop delimits a filament portion of the cutting filament, which is insertable into the interior region, to an insertion length. A deflection element is arranged in the interior region so that the cutting filament can be switched from its first position, without the cutting filament being longitudinally displaced, into a second position. The cutting filament abuts against the deflection element in its second position and the stop does not delimit the length of the filament portion which is insertable into the interior region.

15 Claims, 6 Drawing Sheets

(56) References Cited

U.S. PATENT DOCUMENTS

| | | | |
|---|---|---|---|
| 6,347,455 B2* | 2/2002 | Brant | A01D 34/416 30/276 |
| 6,519,857 B1* | 2/2003 | Proulx | A01D 34/416 30/276 |
| 6,581,292 B2* | 6/2003 | Allis | A01D 34/4166 30/276 |
| 6,842,984 B1* | 1/2005 | Grant | A01D 34/4168 30/276 |
| 6,944,956 B1* | 9/2005 | Fogle | A01D 34/4166 30/276 |
| 7,000,324 B2* | 2/2006 | Fogle | A01D 34/416 30/276 |
| 7,257,898 B2* | 8/2007 | Iacona | A01D 34/416 30/276 |
| 7,587,828 B2* | 9/2009 | Legrand | A01D 34/416 30/276 |
| 8,061,042 B2* | 11/2011 | Arnetoli | A01D 34/4166 30/276 |
| 8,069,574 B2* | 12/2011 | Kato | A01D 34/416 30/276 |
| 8,307,558 B2* | 11/2012 | Alliss | A01D 34/4166 30/276 |
| 8,341,847 B2* | 1/2013 | Kato | A01D 34/416 30/276 |
| 9,265,197 B2* | 2/2016 | Pellenc | A01D 34/4166 |
| 9,693,500 B2 | 7/2017 | Guenther et al. | |
| 10,225,981 B2* | 3/2019 | Kitamura | A01D 34/4166 |
| 2002/0073556 A1* | 6/2002 | Fogle | A01D 34/416 30/276 |
| 2003/0188437 A1* | 10/2003 | Alliss | A01D 34/416 30/276 |
| 2004/0237315 A1* | 12/2004 | Alliss | A01D 34/416 30/276 |
| 2006/0026846 A1* | 2/2006 | Alliss | A01D 34/416 30/276 |
| 2006/0053636 A1* | 3/2006 | Fogle | A01D 34/416 30/276 |
| 2007/0084061 A1* | 4/2007 | Bennett | A01D 34/416 30/276 |
| 2012/0066912 A1* | 3/2012 | Ferrell | A01D 34/4166 30/276 |
| 2015/0223395 A1* | 8/2015 | Pellenc | A01D 34/4161 30/276 |
| 2015/0282425 A1* | 10/2015 | Skinner | A01D 34/4166 30/276 |
| 2015/0305234 A1* | 10/2015 | Guenther | A01D 34/4165 30/276 |
| 2016/0044864 A1* | 2/2016 | Hermann | A01D 34/4166 30/276 |
| 2018/0199507 A1* | 7/2018 | Nevels | A01D 34/4166 |

* cited by examiner

200# FILAMENT CUTTING HEAD FOR A TRIMMER

CROSS-REFERENCE TO RELATED APPLICATIONS

The present application claims priority of EP 17 000 792.6, filed May 9, 2017, the priority of this application is hereby claimed and this application is incorporated herein by reference.

BACKGROUND OF THE INVENTION

The invention relates to a filament cutting head for a trimmer.

DE 10 2014 006 057 A1 discloses a filament cutting head for a trimmer which has a basic body into which two cutting filaments can be inserted from the outside of the filament cutting head from oppositely located sides. The free ends of the cutting filaments project into an interior which is open toward the underside of the filament cutting head. A screening element is arranged in the interior, the portion of the cutting filament which extends in the interior being arranged in the lee of the screening element with reference to the direction of rotation. To remove the cutting filaments, the inside free ends of the cutting filaments are to be gripped by the operator and pulled inward.

It has been shown that on account of it being difficult to access the free ends of the cutting filaments, removal of the cutting filaments is very difficult. Disassembly of the cutting filaments is difficult particularly when using work gloves.

SUMMARY OF THE INVENTION

The object underlying the invention is to create a filament cutting head for a trimmer of the generic type which makes it possible to remove the at least one cutting filament in a simple and rapid manner.

The object is achieved by providing the cutting filament to extend from an outside of the basic body through a filament opening into an interior region of the filament cutting head which is open to the surrounding area. A stop for the cutting filament is arranged on the filament cutting head. In a first position of the cutting filament, the stop delimits the length of a filament portion of the cutting filament which is insertable into the interior region, to an insertion length. At least one deflection element is arranged in the interior region of the filament cutting head such that the cutting filament can be switched from its first position, without the cutting filament being displaced in its longitudinal direction, into a second position. The cutting filament abuts against the deflection element in its second position. The stop, in this case, does not delimit the length of the filament portion which is insertable into the interior region. The switching of the cutting filament from its first position into its second position is possible as a result of bending the inserted filament portion around the opening.

In the second position, the cutting filament can be completely pushed or pulled through the filament opening toward the interior region in a simple manner. The cutting filament, in this case, is guided past the stop by means of the deflection element. As a result, the operator is able to remove the cutting filament from the cutting head in a simple manner. The first position, in this case, is advantageously the position which the cutting filament assumes when the cutting filament is inserted into the cutting head. The cutting filament is advantageously also situated in its first position during the operation of the cutting head. The second position is advantageously only assumed by the cutting filament when a force is exerted in the interior region in the circumferential direction or axial direction of the rotational axis onto the filament portion which is arranged in the interior region.

In an advantageous manner, the cutting filament has an end face at each of its ends, the end face lying approximately in a plane which stands perpendicularly to the longitudinal direction of the cutting filament on the respective ends. If the cutting filament is inserted into the interior region of the filament cutting head, said cutting filament assumes its first position. In an advantageous manner, the cutting filament is in contact with the stop by way of its end face in its first position. The stop can be realized in an advantageous manner as a planar or curved wall. It can also be provided that the stop is formed by a narrowing groove, into which the cutting filament can be inserted until the distance between the groove walls is smaller than the width of the cutting filament and the cutting filament is clamped between the lateral groove walls. In an advantageous manner, the stop is aligned approximately perpendicularly to the longitudinal direction of the cutting filament. However, an angled arrangement of the stop can also be advantageous. The stop advantageously exerts a force onto the cutting filament in the direction of the longitudinal direction of the cutting filament. If, when the cutting filament is inserted into the cutting head, the end face of the cutting filament is pressed against the stop, the cutting filament is only slightly deformed, the cutting filament is advantageously not deformed at all on account of its high inherent rigidity. Accordingly, the cutting filament does not deflect from the stop independently by means of deformation just by inserting the cutting filament into the cutting head. The cutting filament cannot be completely pushed through or pulled through the filament opening into or through the interior region in the first position. Accordingly, the cutting filament cannot be removed out of the filament cutting head in the first position. For this purpose, the cutting filament has to be deformed by the operator. This can be effected in a simple manner by switching the cutting filament into its second position. The cutting filament is able to be pushed past and/or pulled past the stop in the second position.

In the first position of the cutting filament, an inner end of the cutting filament is advantageously aligned in a first direction. The stop lies in the extension of the inner end of the cutting filament in the first direction. In the second position of the cutting filament, the inner end of the cutting filament is advantageously aligned in a second direction, wherein the stop lies outside the extension of the inner end of the cutting filament in the second direction. In the first position, the extension of the inner end of the cutting filament intersects the stop. In the second position, there is no intersection between the extension of the inner end of the cutting filament and the stop.

It is provided that the deflection element is offset transversely with respect to the first direction in relation to the cutting filament in the viewing direction of the rotational axis. As a result, the cutting filament can be offset transversely with respect to its first direction and moved into its second position in a simple manner. The cutting filament can be offset from the first position into the second position without displacing the cutting filament in its longitudinal direction. The operator can move the cutting filament into its second position simply by pushing the cutting filament transversely with respect to the first direction of the cutting filament or by bending the inside filament portion around the filament opening. Such displacement or bending of the filament is also possible when the cutting filament is hardly accessible, for example on account of the structural shaping of the cutting head or on account of the contaminants being generated in the interior region in operation.

In an advantageous manner, the filament opening has a lower opening edge on the inner region of the filament cutting head, and the deflection element has a support. The support corresponds to the region of the deflection element which interacts with the switched filament portion. The support absorbs at least the restoring forces of the elastically bent filament portion which act in the axial direction of the rotational axis. The filament opening has a lower opening edge and an upper opening edge, the lower opening edge, measured in the direction of the rotational axis, being closer to the underside of the cutting head than the upper opening edge. In an advantageous manner, the cutting filament abuts against both the lower opening edge and the support by way of the filament portion in the second position. Advantageously, the distance, measured in the direction of the rotational axis, between the support and the lower opening edge is smaller than a height of the filament opening, in particular smaller than the diameter of the cutting filament. In order to switch the cutting filament from its first position into its second position, advantageously only a small displacement and/or bending in the axial direction of the rotational axis is necessary, which can easily be exerted by the operator. The height of the filament opening corresponds to the distance between the lower opening edge and the upper opening edge measured in the direction of the rotational axis. If the cutting filament abuts against the support, the inner end of the cutting filament is thus aligned with respect to the plane of the underside of the basic body in a second direction. The end face of the cutting filament advantageously encloses with the underside an angle which is greater than or equal to 90° in the first position and an angle which is less than 90° in the second position. In the second position, the end face accordingly points in part toward the underside. The plane of the underside of the basic body, in this case, is a plane in which the underside of the basic body is located. If the filament cutting head is placed onto a planar, horizontal surface, the plane of the underside corresponds to the planar horizontal surface. The plane of the underside is advantageously perpendicular to the rotational axis of the filament cutting head.

The deflection of the cutting filament in the axial direction of the rotational axis is, in particular, smaller than the deflection in the circumferential direction with respect to the rotational axis. It is advantageously provided that the first direction and the second direction of the cutting filament enclose an angle of at least 5°, in particular of at least 10°, advantageously of at least 20°, advantageously of at least 40° with one another in the viewing direction of the rotational axis of the filament cutting head. As a result, the cutting filament can be guided past the side of the stop in its second position when seen in the viewing direction of the rotational axis. It is advantageously provided that the first direction and the second direction of the cutting filament, in a top view onto a longitudinal plane which includes the rotational axis and extends parallel to the longitudinal axis of the filament opening, enclose an angle of at least 5°, in particular of at least 10°, in particular of at least 20°, advantageously of at least 40°. The inner end of the cutting filament is arranged in an advantageous configuration in the second position offset relative to the first position both in the direction of the rotational axis and in the circumferential direction to the rotational axis.

In an advantageous manner, the support of the deflection element comprises a locking contour for securing the cutting filament in the second position. The locking contour serves for supporting, in particular for latching, the cutting filament transversely with respect to the second direction. The locking contour absorbs the restoring forces of the elastically bent filament portion which act in the circumferential direction to the rotational axis. The locking contour can be realized in particular as a lug. If the cutting filament is switched from its first position into its second position, it is prone to spring back into its first position on account of its inherent rigidity. By means of the locking contour, the cutting filament can be held in its second position in opposition to its inherent rigidity. This makes it possible for the operator to switch the cutting filament from the first position into the second position, and then to push or pull the cutting filament, without having to hold it actively on the deflection element in its second position, in a simple manner completely through the filament opening toward the interior region.

It can be provided that the distance between the filament opening and the stop corresponds to no more than 15 times, in an advantageous manner to no more than 10 times the diameter, in particular 8 times the diameter of the cutting filament. As a result, the length of the cutting filament guided in the interior region of the filament cutting head is comparatively small. In an advantageous manner, the distance between the filament opening and the stop corresponds to at least 3 times, in particular at least 5 times the diameter of the cutting filament. As the distance between the filament opening and the stop becomes greater, a longer filament portion can be inserted into the interior region and on account of the extended length is able to be switched in a simpler manner from the first position into the second position.

In an advantageous manner, a screening wall is arranged next to the cutting filament in the circumferential direction of the rotational axis in the interior region of the filament cutting head. In an advantageous manner, the screening wall extends from the filament opening up to the stop in an approximately radial direction with reference to the rotational axis. It has been shown that as a result of a screening wall, in the lee of which the cutting filament runs, the tendency to contamination of the filament cutting head can be clearly reduced. The screening wall directs contaminants, such as for example cuttings or the like, past the filament portion arranged in the interior region and largely avoids the contaminants being able to settle in the region of the cutting filament in the interior region. The cutting filament, in this case, is arranged advantageously with respect to the screening wall such that at least half of the length of the filament portion which extends in the interior region extends adjacent to the screening wall. The distance between the cutting filament and the screening wall, in this case, is advantageously no more than 2 times the diameter of the cutting filament.

It can be provided that the basic body has an underside which faces the ground in operation, wherein the inner region is open toward the surrounding area on the underside of the basic body. In an advantageous manner, the distance, measured in the direction of the rotational axis, between the underside and the inner end of the cutting filament is greater in the first position than in the second position.

The deflection element is advantageously realized as a ramp. The deflection element can be formed in an alternative configuration, in particular, by a pin. Other configurations of the deflection element can also be advantageous.

In a further realization according to the invention, a filament cutting head is provided for a trimmer, wherein the filament cutting head is rotatingly drivable about a rotational axis in operation, wherein the filament cutting head has a basic body on which at least one cutting filament is held, wherein the cutting filament extends from an outside of the basic body through a filament opening into an interior region of the filament cutting head which is open to the surrounding area, wherein a stop for the cutting filament is arranged on the filament cutting head, wherein, an inner end of the cutting filament is aligned in a first direction in a first position of the cutting filament, and the stop lies in extension of the inner end of the cutting filament in the first direction, characterized in that at least one deflection element is arranged in the interior region of the filament cutting head, wherein the at least one deflection element is realized such that the cutting filament abuts against the deflection element in a second position and the inner end of the cutting filament is aligned in a second direction, wherein the stop lies outside, that is to say not in the extension of the inner end of the cutting filament in the second direction. This provides an independent inventive concept.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
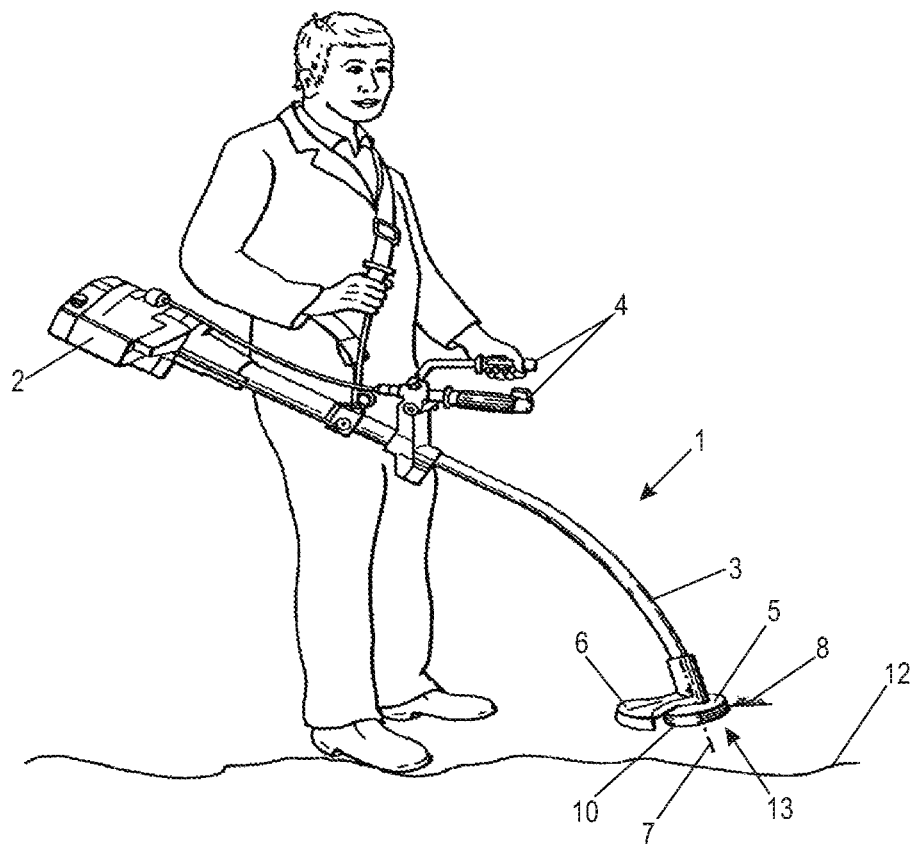
FIG. 1 shows a schematic representation of a trimmer held by an operator.

FIG. 1 shows a schematic representation of a trimmer 1 which is held by an operator. The trimmer 1 has a housing 2 in which a drive motor (not shown) is arranged. The trimmer 1 has a shaft 3 which is arranged on the housing 2 with one end and carries a filament cutting head 5 on its other end. A drive shaft (not shown), which is driven by the drive motor arranged in the housing 2 and drives the filament cutting head 5 in a rotating manner about a rotational axis 7, projects through the shaft 3. The drive motor can be an internal combustion engine or an electric motor. It can also be provided that the drive motor is arranged on the end of the shaft 3 which carries the filament cutting head 5. This is particularly advantageous when the drive motor is an electric motor. The filament cutting head 5 is covered by a protective cover 6 on the side facing the operator in operation. The filament cutting head 5 has at least one cutting filament 8 which serves for cutting cuttings such as grass, undergrowth or the like. The filament cutting head 5 includes a basic body 10. An underside 13, which faces the ground 12 in operation and is arranged on the side of the filament cutting head 5 remote from the shaft 3, is realized on the basic body 10. To guide the trimmer 1 in operation, handles 4 are provided which are arranged in the exemplary embodiment on a gripping bar which is fastened to the shaft 3. The protective clothing which has to be worn by the operator when operating a trimmer is not shown in the simplified representation in FIG. 1.

Figure 2:
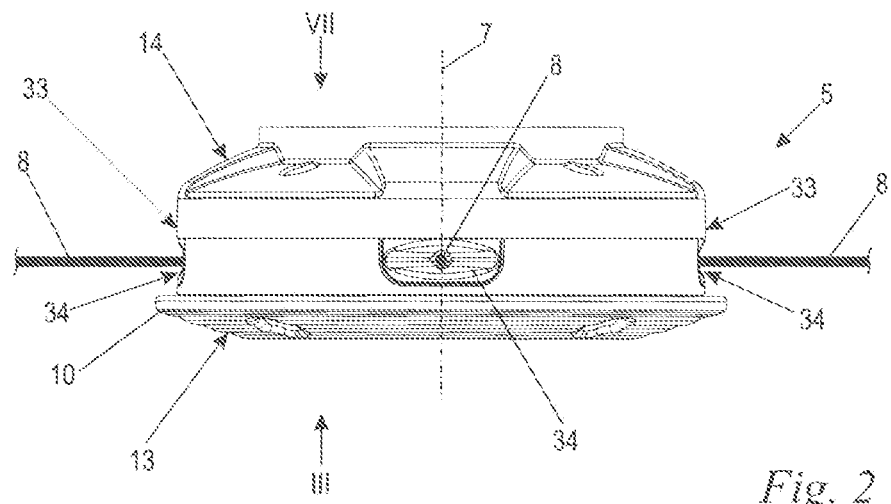
FIG. 2 shows a side view of the filament cutting head of the trimmer from FIG. 1.

FIG. 2 shows a side view of the filament cutting head 5, the underside 13 of the basic body 10 being directed downward in the viewing direction. The basic body 10 has an upper side 14 which is directed away from the underside 13. The upper side 14 and the underside 13 are connected via an outside 33 of the filament cutting head 5 which is realized in the exemplary embodiment in a substantially cylindrical manner to the rotational axis 7. The filament cutting head 5 includes openings 34 which extend from the outside 33 into the basic body 10. The filament cutting head 5, in the exemplary embodiment, includes four cutting filaments 8 which, proceeding from the outside 33, are each inserted through an opening 34 into the basic body 10.

Figure 3:
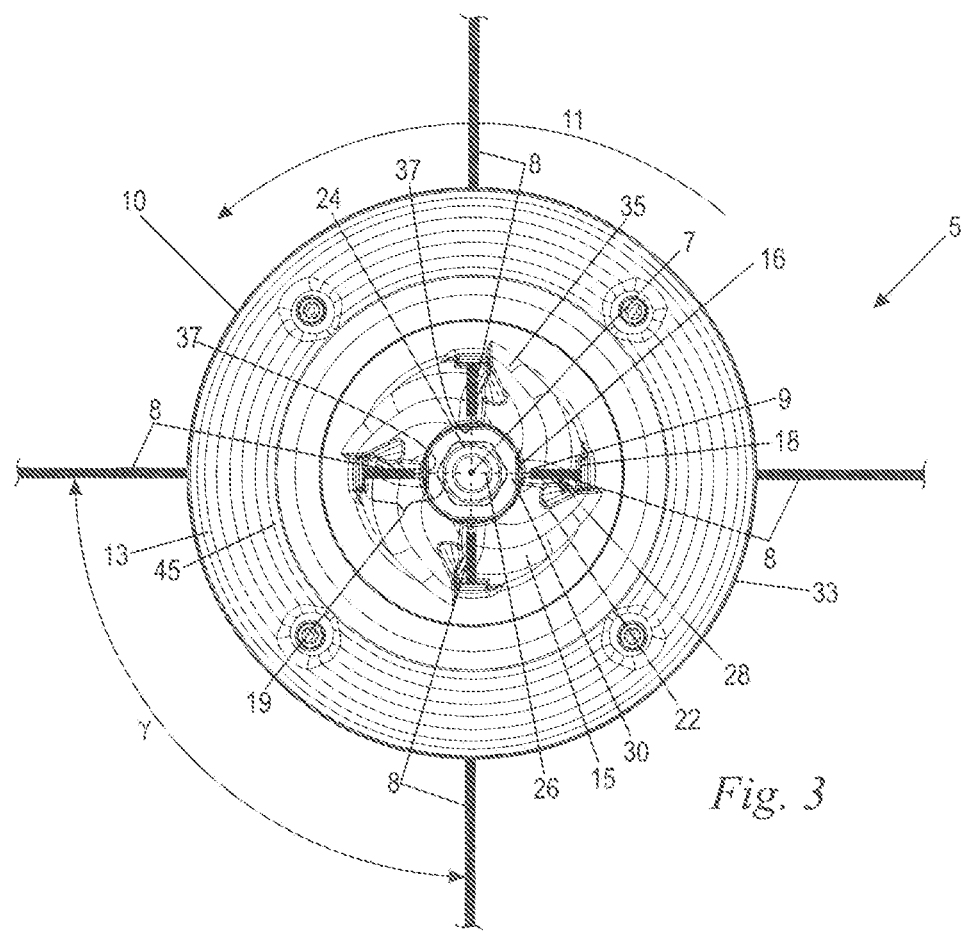
FIG. 3 shows a view from below of the filament cutting head of the trimmer in the direction of the arrow III from FIG. 2 with cutting filaments in the first position.

FIG. 3 shows that the four cutting filaments 8 are inserted from the outside 33 into the basic body 10 and project out of the filament openings 18 into an interior region 15 of the filament cutting head 5. The interior region 15 is delimited to the upper side 14 (FIG. 2) by a roof surface 35. The interior region 15 is open toward the underside 13. The basic body 10 has a ring portion 45 which separates the outside 33 from the interior region 15. The basic body 10 includes filament channels 36 (FIGS. 8 to 11), the filament channels 36 extending from the openings 34 on the outside 33 to the filament openings 18 in the interior region 15. The filament channels 36 project through the ring portion 45.

FIG. 3 shows the cutting filaments 8 in a first position 28 for operation. The arrangement is described below using one of the cutting filaments 8 as an example. The cutting filament 8 has a radially inside, free inner end 9. In the operating position, the cutting filament 8 assumes a first position 28 at its inner end 9 which is located in the interior region 15. In said first position 28, the inner end 9 of the cutting filament 8 points in a first direction 26. The inner end 9 of the cutting filament 8 can be lengthened in the first direction 26 to form an imaginary extension 30. In the exemplary embodiment, the filament cutting head 5 has four cutting filaments 8. The cutting filaments 8 are each, in particular, at an identical angular distance γ to one another, which is 90° in the exemplary embodiment. The angular distance γ, in this case, is measured between the openings 34 of the outside 33 around the rotational axis 7. In the exemplary embodiment, each of the inner ends of the cutting filaments 8 are also at an angle with respect to one another corresponding to the angular distance γ. A different angular distance γ and/or a different number of cutting filaments 8 can also be advantageous. The inner ends 9 of the cutting filaments 8 extend advantageously radially to the rotational axis 7 in the first position 28 of the cutting filaments 8 in the interior region 15. In the exemplary embodiment, in the first position 28 of the cutting filaments 8, the longitudinal axes intersect at the inner ends 9 of two cutting filaments 8, in particular of four cutting filaments 8, in a preferred manner of all the cutting filaments 8.

As can also be seen in FIG. 3, the basic body 10 has a hub 24 which is arranged coaxially to the rotational axis 7 in the interior region 15. The hub 24 serves for the bearing arrangement of the filament cutting head 5 on a drive shaft of the trimmer 1. The drive shaft of the trimmer 1 drives the filament cutting head 5 in a rotating manner about the rotational axis 7 in a direction of rotation 11. The imaginary extension 30 projects to the hub 24.

Figure 8:
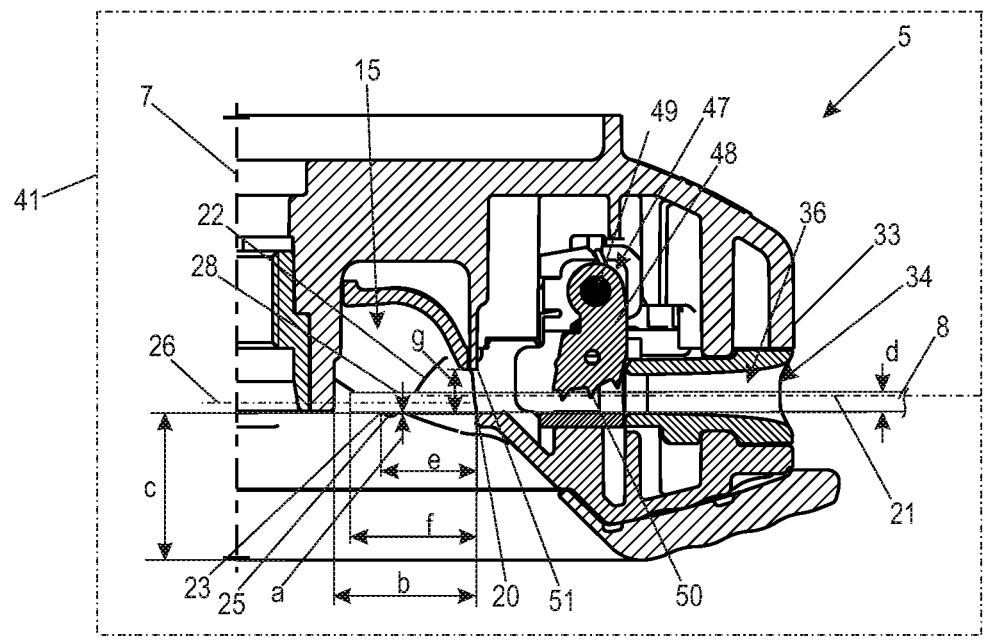
FIG. 8 shows a sectional representation of a detail along the line VIII-VIII in FIG. 7 with a schematically shown cutting filament in the first position.

FIG. 3 shows that a stop 16 for each cutting filament 8 is realized in each case on the hub 24. The stop 16 lies in the imaginary extension 30 of the cutting filament 8 in the first position 28. The cutting filament 8 has an end face 37 on its inner end 9 which is directed toward the interior region 15. The end face 37 lies in a plane which is aligned perpendicularly to the longitudinal direction of the cutting filament 8 on its inner end 9. In an advantageous realization, the end face 37 of the cutting filament 8 can also lie in a plane which is aligned at a different angle to the longitudinal direction of the cutting filament 8 on the inner end 9. The end face 37 of the cutting filament 8 can also be realized in a rounded manner. The stop 16 delimits a length f (FIG. 8) of a filament portion 19 of the cutting filament 8 which is insertable into the interior region 15 to an insertion length b (FIG. 8). If the length f of the filament portion 19 corresponds to the insertion length b, the end face 37 of the cutting filament 8 abuts against the stop 16.

The stop 16 can advantageously be aligned perpendicularly to the first direction 26 of the cutting filament 8. In an advantageous realization, the stop 16 can also be realized as a rounded surface, for example a convex or concave surface, or as an irregular surface. The stop 16 is realized, in particular, on a hub 24 which surrounds the rotational axis 7, the surfaces of the stop 16 being advantageously machined. This can be seen in particular in FIG. 5. It can also be expedient for a circumferential wall, which is located opposite the filament opening 18, to form the stop 16. On account of the high inherent rigidity of the cutting filament 8, the stop 16 also serves, when it is realized in a rounded manner, for delimiting the length f of the filament portion 19, as the cutting filament 8 is only deformed under very high insertion forces or pressure forces and can only deflect from the stop 16 as a result of such forces. If the cutting filament 8 is pushed against the stop 16 by the operator, a normal force which is directed perpendicularly to the stop 16 counteracts the cutting filament 8 via the stop. The above-mentioned realizations for the cutting filament 8 apply to all cutting filaments 8 of the filament cutting head 5. The stop 16 serves as support when the cutting radius is adjusted. The operator can insert cutting filaments 8 of the same length in each case as far as the stops 16. The outwardly projecting free ends of the cutting filaments 8 are then at the identical distance to the rotational axis 7. However, it is not absolutely necessary for the cutting filaments 8 to be inserted up to the stops 16.

As shown in FIG. 3, a deflection element 22 is arranged adjacent to each filament opening 18 in the interior region 15. The deflection element 22, in the top view in FIG. 3, is arranged offset transversely to the first direction 26 in relation to the cutting filament 8. The deflection element 22 is located upstream of the adjacent cutting filament 8 with reference to the direction of rotation 11. It can also be advantageous to arrange the deflection element 22 downstream of the cutting filament 8.

Figure 4:
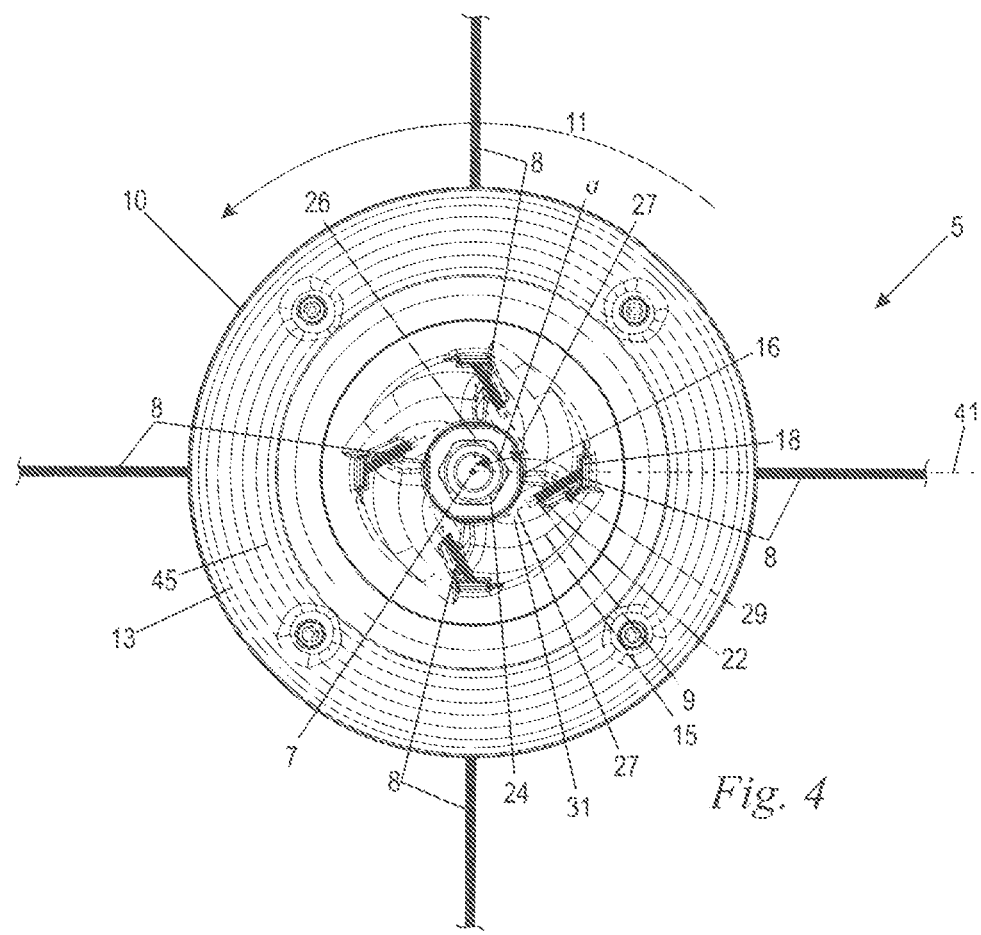
FIG. 4 shows a view from below of the filament cutting head of the trimmer in the direction of the arrow III from FIG. 2 with cutting filaments in the second position.

The representation of the filament cutting head 5 shown in FIG. 4 differs from the representation of the filament cutting head 5 in FIG. 3 solely in that the filament portion 19 which projects into the interior region 15 is switched to the deflection element 22. The cutting filament 8 is in a second position 29, the inner end 9 of the cutting filament 8 being aligned in a second direction 27. An imaginary extension 31 of the cutting filament 8 in the second direction 27 lies outside the stop 16 in the second position 29 of the cutting filament 8. In order to remove the cutting filament 8 from the filament cutting head 5, the operator can switch the cutting filament 8 from its first position 28 into its second position 29 on the deflection element 22. To switch the cutting filament 8, the operator can bend the filament portion 19 transversely with respect to its first direction 26 in the direction of the deflection element 22. Pushing and/or pulling the cutting filament 8 longitudinally to its first direction 26 is advantageously not necessary. In order to switch the inner end 9 of the cutting filament 8 to the deflection element 22, the operator can press the cutting filament 8 in the direction of the deflection element 22 on a side of the cutting filament 8 located opposite the deflection element 22. Encompassing the cutting filament 8 is not necessary in this case. If the cutting filament 8 is in its second position 29, the cutting filament 8 can be pushed or pulled over the deflection element 22 out of the basic body 10. In order to be able to remove the cutting filament 8, the cutting filament 8 must first of all deflect in a direction which does not block the cutting filament 8 being pushed or pulled further into the interior region 15. Pulling the cutting filament 8 at the same time as switching the cutting filament 8 from its first position 28 into the second position 29 is made difficult as a result of the filament portion 19 being difficult to grasp and of the high inherent rigidity of the cutting filament 8. A separation in time between the deflection movement relative to the stop 16 and the removal movement of the cutting filament 8 is made possible by means of the deflection element 22. The deflection element 22 holds the cutting filament 8 in the second position 29. Once the cutting filament 8 has been switched from its first position 28 into the second position 29, the cutting filament 8 only still has to be pushed and/or pulled along its longitudinal axis out of the basic body 10.

As shown in FIG. 4, the first direction 26 and the second direction 27 of the cutting filament 8 enclose an angle α of at least 5° in the top view shown in FIG. 4 of the underside 13 with the viewing direction in the direction of the rotational axis 7. In an advantageous realization, the angle α between the first direction 26 and the second direction 27 of the cutting filament 8 can be at least 10°, in particular at least 20°, in an advantageous manner at least 40°. The angle α between the first direction 26 and the second direction 27 is open toward the interior region 15. In an advantageous realization, the size of angle α between the first direction 26 and the second direction 27 of the cutting filament 8 is chosen such that the extension 31 of the switched inner end 9 of the cutting filament 8 is located outside the stop 16, in particular outside the hub 24. The second direction 27 extends tangentially with respect to the rotational axis 7 such that the filament portion 19, which is situated in the interior region 15, is deflected to the side of the stop 16 which is realized on the hub 24 in the exemplary embodiment.

As shown in FIG. 4, in the exemplary embodiment the inner ends 9 of the cutting filaments 8 in the second position 29 extend advantageously tangentially with respect to the rotational axis 7 in the interior region 15. In the exemplary embodiment, at least the longitudinal axes on the inner ends 9 of oppositely situated cutting filaments 8 do not intersect in the second position 29 of the cutting filaments 8. In particular, the longitudinal axes of the cutting filaments 8 on the inner ends 9 extend in a skewed manner with respect to one another when viewed in space.

Figure 5:
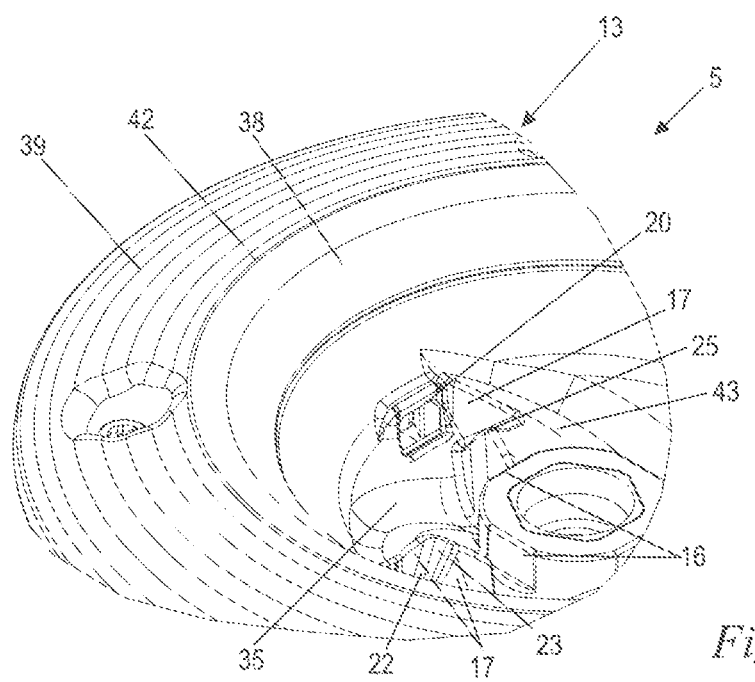
FIGS. 5 and 6 show enlarged representations in perspective of the basic body from FIG. 2.

FIG. 5 shows that a circumferential wall 38 is realized on the ring portion 45. The circumferential wall 38, proceeding from the ring portion 45 of the filament cutting head 5, extends into the interior region 15 and merges into the roof surface 35.

The circumferential wall 38 extends conically to the rotational axis 7 and is tapered in the direction of the roof surface 35. The conical configuration of the circumferential wall 38 serves the purpose of drawing contaminants, such as grasses or similar, out of the filament cutting head 5 during the operation of the trimmer 1 as a result of centrifugal forces being generated on the circumferential wall 38. In an advantageous realization, the circumferential wall 38 can also be realized cylindrically to the rotational axis 7. Other designs of the circumferential wall 38 are also possible.

FIG. 5 shows a bottom surface 39 of the basic body 10 which, proceeding from the underside 13 of the filament cutting head 5, extends radially outward with reference to the rotational axis 7 on the ring portion 45. In this case, the maximum distance between the rotational axis 7 and the bottom surface 39, measured in the radial direction of the rotational axis 7, is greater than the radial distance between the rotational axis 7 and the outside 33. With an increasing distance to the rotational axis 7, the ring portion 45 extends radially outward in the direction of the upper side 14.

As shown in FIG. 5, a screening wall 17 is provided in the interior region 15. The screening wall 17 is arranged upstream of the filament portion 19 in the direction of rotation 11 of the filament cutting head. The screening wall 17 is arranged adjacent to the filament portion 19 of the cutting filament 8. In the exemplary embodiment, the deflection element 22 is realized in the screening wall 17. A realization of the deflecting element 22 separately from the screening wall 17 is also possible. A helical portion 43, which is formed by the roof surface 35, is arranged upstream of the screening wall 17 in the direction of rotation 11. The helical portion 43 extends over at least approximately 30%, in particular over at least approximately 50%, preferably over at least approximately 70% of the angular distance γ between the cutting filaments 8 shown in FIG. 3.

Figure 6:
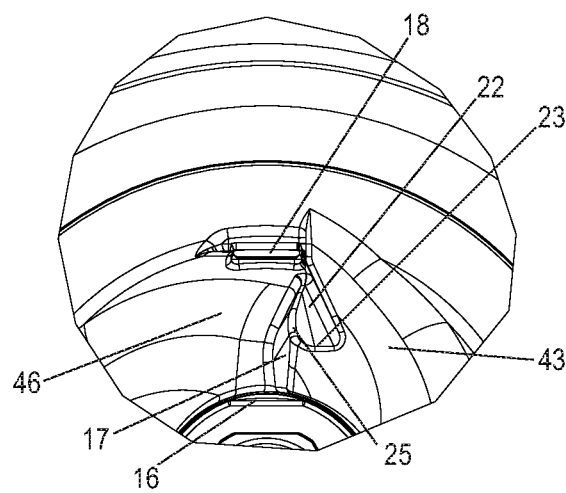

FIG. 6 shows the screening wall 17 which extends parallel and approximately radially to the rotational axis 7 in the exemplary embodiment and forms a step in the roof surface 35. In the exemplary embodiment, the screening wall 17 adjoins the helical portion 43 in the direction of rotation 11 at least in part. In the exemplary embodiment, a support 23 is realized on the deflection element 22. In an advantageous manner, the deflection element 22 adjoins the support at least in part at the helical portion 43. In the exemplary embodiment, the deflection element 22 is realized as a ramp. In an advantageous, alternative realization, the deflection element can be formed by a pin, other configurations also being possible. If the cutting filament 8, which is not shown in FIG. 6, is situated in its second position 29, the cutting filament 8 abuts against the support 23. To support the cutting filament 8 transversely with respect to the second direction 27 of the cutting filament 8, a locking contour 25 is arranged on the deflection element 22. In the exemplary embodiment, the locking contour 25 supports the cutting filament 8 on the side downstream in the direction of rotation 11. The locking contour 25 is realized as an elevation on the support 23 and projects in the direction of the underside 13. The locking contour 25 is arranged between the support 23 and the screening wall 17. If the operator switches the cutting filament 8 from its first position 28 into its second position 29, the locking contour 25 serves for latching the cutting filament 8 in the second position 29. The cutting filament 8 is supported by the locking contour 25 and remains in its second position 29 without the operator doing anything. The locking contour 25 prevents the bent filament portion 19 from springing back elastically into the first position 28. In the exemplary embodiment, the locking contour 25 is realized as a lug. In an advantageous realization, the locking contour 25 can also be designed in a different manner.

As FIG. 6 shows in conjunction with FIG. 3, in its first position 28 the cutting filament 8 lies with the filament portion 19 radially to the rotational axis 7 and adjacent to the screening wall 17. A narrow gap is formed between the screening wall 17 and the filament portion 19 in the circumferential direction to the rotational axis 7. In the exemplary embodiment, the gap is narrowed toward the rotational axis 7. The filament portion 19 extends approximately parallel to the screening wall 17. FIG. 6 shows that the screening wall 17 forms a lee downstream with reference to the direction of rotation 11. In the operation of the trimmer 1, the inner end 9 of the cutting filament 8 lies in the lee of the deflection element 22. This reduces the interior region 15 being prone to contamination. As the cutting filament 8 extends adjacent to the screening wall 17 in the exemplary embodiment, encompassing the filament portion 19 in the first position 28 is difficult. The gap is in particular narrower than a finger width. The circumferential side of the cutting filament 8, which is directed to the screen element 17 or delimits the gap, is very hard to grasp in the first position 28. The roof surface 35 is realized as a free surface 46 adjacent to the deflection element 22 downstream of the screen element 17 with reference to the direction of rotation 11. The free surface 46 in the exemplary embodiment lies approximately in a plane which lies perpendicular to the rotational axis 7. The free surface 46 can also be formed inside the first 45°, in particular inside the first 20°, advantageously at the start of the helical portion 43 and accordingly extend in a helical manner relative to the rotational axis 7.

The distance between the free surface 46 and the underside 13, measured along the rotational axis 7, is greater than the distance between the cutting filament 8 and the underside 13. The free surface 46 extends in the circumferential direction to the rotational axis 7 over the cutting filament 8, in particular the entire diameter d of the cutting filament 8. In an advantageous realization with the cutting filament 8 in the first position 28, the distance between the cutting filament 8 and the free surface 46 along the cutting filament portion 19, measured in the direction of the rotational axis 7, corresponds to at least 2 times the diameter d of the cutting filament 8. As a result, the operator can push his finger between the cutting filament 8 and the free surface 46 in order to switch the cutting filament in a simple manner from its first position 28 to its second position 29. In the exemplary embodiment, the free surface 46 makes it possible for the operator to access the cutting filament 8. The cutting filament 8 has a leading circumferential side which faces the screening wall 17, a trailing circumferential side which is remote from the screening wall 17, an upper side which faces the roof surface 35 and an underside which is remote from the roof surface 35. In the exemplary embodiment, the free surface 46 makes it possible for the operator to access the cutting filament 8 on the trailing circumferential side of the cutting filament 8 and in the case of a sufficiently large axial distance between the cutting filament 8 and the free surface 46, measured in the direction of the rotational axis 7, also on the upper side of the cutting filament 8. The operator can contact the cutting filament 8 along the entire filament portion 19 by the free surface 46. The operator can contact the cutting filament 8 along the entire filament portion 19 on its trailing circumferential side by the free surface 46. The cutting filament cross section is surrounded in an L-shaped manner by the free surface 46 on its upper side and by the screening wall 17 on its leading circumferential side. The cutting filament 8 is freely accessible on its underside and on its trailing circumferential side. If the cutting filament 8 is in its first position 28, proceeding from the free surface 46 the operator can press his finger against the cutting filament 8 in the direction of the deflection element 22 and as a result switch the cutting filament 8 from its first position 28 into its second position 29 on the deflection element 22.

Figure 7:
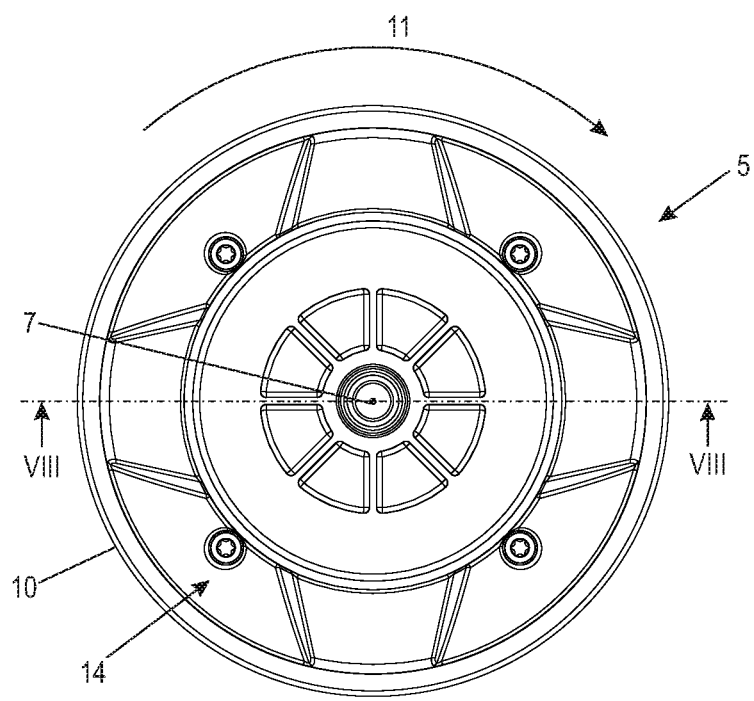
FIG. 7 shows a view from above of the filament cutting head of the trimmer in the direction of the arrow VII in FIG. 2.

FIG. 7 shows the upper side 14 of the filament cutting head 5. The basic body 10 is realized axially symmetrically in space to the rotational axis 7, in the top view shown in FIG. 7 consequently point symmetrically.

Figure 9:
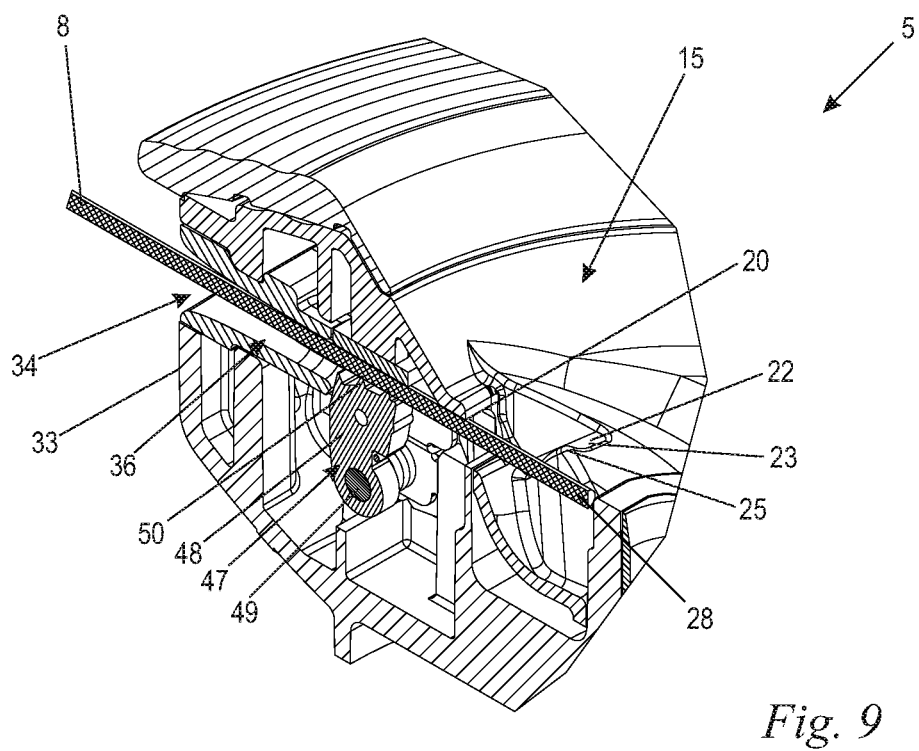
FIG. 9 shows a sectional representation in perspective of a detail along the line VIII-VIII in FIG. 7 with a cutting filament in the first position.

FIG. 8 shows a section of the filament cutting head 5 along the line VIII-VIII in FIG. 7. FIG. 9 shows a perspective representation of FIG. 8. FIGS. 8 and 9 show the filament channel 36 which extends from the opening 34 of the outside 33 to the filament opening 18 in the circumferential wall 38 of the interior region 15. The cutting filament 8 extends from the outside 33 through the filament channel 36 into the interior region 15. In this case, the cutting filament 8 is held by a clamping device 47 which is situated in the basic body 10. The clamping device 47 prevents the cutting filament 8 moving radially outward. The clamping device 47 is arranged radially between the outside 33 and the interior region 15 of the filament cutting head 5. The clamping device 47 has a pivotably mounted pawl 48 which is pivotable about a pivot axis 49. The pivot axis 49 is arranged such that the pawl 48, when the cutting filament 8 moves inward, toward the rotational axis 7 of the filament cutting head 5, reduces the clamping action and releases the cutting filament 8. The pawl 48, in this case, projects into the filament channel 36. A movement of the cutting filament 8 radially outward causes the clamping action of the clamping device 47 to strengthen. In the possible contact region between the pawl 48 and the cutting filament 8, the pawl has a retaining structure 50 which is formed by a toothed structure in the exemplary embodiment. The retaining structure 50 abuts against the cutting filament 8. As a result, the cutting filament 8 is held securely in the filament channel 36 by the clamping device 47. In order to remove the cutting filament 8 from the filament cutting head 5, the cutting filament 8 can be pushed and/or pulled by the operator, with the cutting filament 8 in a second position 29, completely through the filament channel 36 into the interior region 15. In the first position 28, the movement of the cutting filament 8 inward is delimited such that the inner end 9 of the cutting filament 8 projects by no more than the insertion length b into the interior region 15 and the clamping device 47 clamps the cutting filament 8. The insertion length b is shorter than the length of the filament channel 36 in the exemplary embodiment.

As shown in FIG. 8, the insertion length b is measured between the stop 16 and the filament opening 18 of the respective cutting filament 8 in the radial direction with reference to the rotational axis 7. The distance b in the exemplary embodiment is no more than 10 times, in particular no more than 8 times the diameter d of the cutting filament 8. In the case of a cutting filament 8 with an irregular cross section, the diameter d is the largest extent of the cutting filament 8 transversely with respect to its longitudinal extension. The filament opening 18 has a lower opening edge 20 and an upper opening edge 51. The lower opening edge 20 is arranged below the upper opening edge 51 in the side view in FIG. 8. The lower opening edge 20 is closer to the underside 13 of the filament cutting head 5 than the upper opening edge 51. The distance between the lower opening edge 20 and the upper opening edge 51, measured parallel to the rotational axis 7, corresponds to the height g of the filament opening 18. In the exemplary embodiment, the insertion length b corresponds to no more than 5 times the height g of the filament opening 18. The insertion length b between the filament opening 18 and the stop 16 corresponds in the exemplary embodiment to at least 3 times the diameter d of the cutting filament 8, in an advantageous realization in particular to 3 times the height g of the filament opening 18.

FIG. 8 also shows that the distance a between the support 23 and the lower opening edge 20, measured in the axial direction of the rotational axis 7, is shorter, in particular is several times shorter than the insertion length b. In the exemplary embodiment, the distance a is shorter than the height g of the filament opening 18, in particular shorter than the diameter d of the cutting filament 8. The distance e between the support 23 and the lower opening edge 20, measured in the radial direction to the rotational axis 7, is shorter than the insertion length b and is, in particular, between 1 times the diameter d and 8 times the diameter d, in particular 3 times the diameter d and 6 times the diameter d of the cutting filament 8. During the switch, the filament portion 19 is deflected or bent in the circumferential direction to the rotational axis 7 by an angle α and/or in the axial direction of the rotational axis 7 by an angle β in relation to its first position 28. The support 23 is at a minimum distance to the filament opening 18 which is shorter than the insertion length b of the cutting filament 8. In this way, the filament portion 19 can be switched to the support 23 by bending around the filament opening 18. The switching to the support 23 does not require the cutting filament 8 to move inward along its longitudinal axis. The support 23 is also advantageously at a maximum distance to the filament opening 18. When the insertion length b is greater than the maximum distance, the inner end 9 of the cutting filament 8 projects advantageously over the support 23 once switched and is thus able to be gripped more easily by the operator.

FIG. 8 also shows that the cutting filament 8, in its first position 28, is at a minimum distance c to the underside 13 of the filament cutting head 5, measured in the axial direction of the rotational axis 7. The minimum distance c corresponds to the distance between the point of the cutting filament 8 which is at the shortest distance to the underside 13 of the basic body 10 measured in the direction of the rotational axis 7, and the underside 13. In the exemplary embodiment, the lower edge 20 of the filament opening 18 is also at the distance c to the underside 13 of the filament cutting head 5. The length f of the filament portion 19 which is insertable into the interior region 15 is measured proceeding from the filament opening 18 right up to the end face 37 of the cutting filament 8 along a cutting filament center line which runs through the center points of the cutting filament cross sections.

Figure 10:
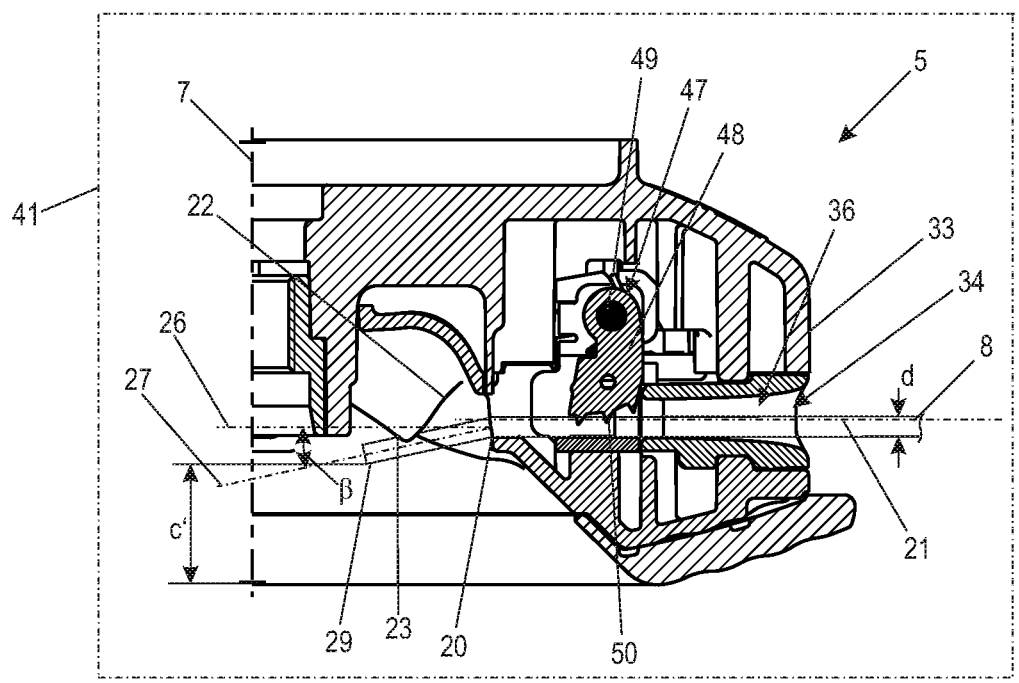
FIG. 10 shows a sectional representation of a detail along the line VIII-VIII in FIG. 7 with a schematically shown cutting filament in the second position.
Figure 11:
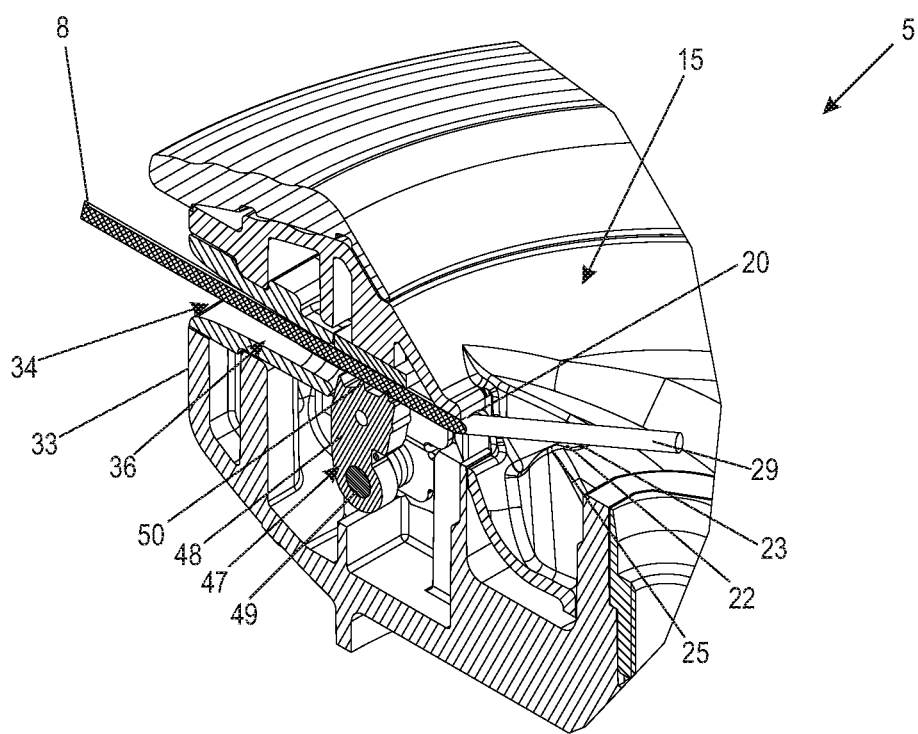
FIG. 11 shows a sectional representation in perspective of a detail along the line VIII-VIII in FIG. 7 with a cutting filament in the second position.

FIG. 10, as also FIG. 8, shows a section along the line VIII of FIG. 7, but with the cutting filament 8 situated in its second position 29. FIG. 11 shows a perspective representation of FIG. 10. Both FIG. 10 and FIG. 11 show that the cutting filament 8 abuts against the deflection element 22 in its second position 29. The cutting filament 8, in this case, is in contact with the lower opening edge 20 at the filament opening 18 and with the support 23 at the deflection element 22. The opening edge 20 and the support 23, in this case, are arranged on oppositely situated longitudinal sides of the cutting filament 8. The filament portion 19 is bent around the lower opening edge 20. The filament, in this connection, is elastically deformed and is supported on the support 23. If the cutting filament 8 projects so far into the interior region 15 that the length f of the insertable filament portion 19 is greater than the minimum distance, but shorter than the maximum distance between the support 23 and the lower opening edge 20, the cutting filament 8 then abuts against the support 23. In this case, the support 23 can be developed such that the cutting filament 8 is in contact with the support 23 at at least one point, in particular at at least two points. In an advantageous realization, there is at least one line contact, in particular a surface contact, between the support 23 and the cutting filament 8. The minimum distance c', measured in the direction of the rotational axis 7, between the cutting filament 8 and the underside 13 of the filament cutting head 5 in the second position 29 of the cutting filament 8 is shorter than the distance c of the cutting filament 8 in the first position 28. The end face 37 of the deflected cutting filament 8 is located closer to the underside 13 of the filament cutting head 5 than the end face 37 of the non-deflected cutting filament 8. In the second position 29, the extension 31 of the cutting filament 8 directly adjacent to the hub 24 is guided past the hub 24. As a result, the cutting filament 8 is minimally deflected and deformed in the second position 29. The force required for the switch is minimized as a result.

FIG. 10 also shows that the first direction 26 and the second direction 27 of the cutting filament 8 in a top view of a longitudinal plane 41, which includes the rotational axis 7 and extends parallel to the longitudinal axis 21 of the filament opening 18, encloses an angle β of at least 5°, in particular of at least 10°. The first direction 26 is advantageously aligned radially with respect to the rotational axis 7, and the second direction 27 has an axial and/or radial direction component with reference to the rotational axis 7 along with the radial direction. The longitudinal axis 21 of the filament opening 18 corresponds to a straight line which lies in the center of gravity of the surface surrounded by the filament opening 18 and is aligned perpendicularly to the surrounded surface. The angle β opens toward the rotational axis 7. The angle β, in an advantageous realization, is at least large enough such that the extension 31 of the cutting filament 8 in its second direction 27 lies outside the stop 16 in the axial direction. The angle β is at least large enough such that the cutting filament 8 in its second position 29 can be pushed and/or pulled over the deflection element 22 past the stop 16, in particular past the hub 24 of the filament cutting head 5 by the operator. The deflecting of the cutting filament 8 in relation to the stop 16 in the axial direction to the rotational axis 7 is defined by means of the angle β. The deflecting of the cutting filament 8 in relation to the stop 16 in the circumferential direction to the rotational axis 7 is defined by the angle α which is shown in FIG. 4 and is described in detail above in the description regarding FIG. 4. In the exemplary embodiment, in the first position 28 the inner end 9 of the cutting filament 8 lies with the cutting filament 8 in a plane which extends parallel to the underside 13. In the second position 29, the inner end 9 is arranged between said plane and the underside 13.

While specific embodiments of the invention have been shown and described in detail to illustrate the inventive principles, it will be understood that the invention may be embodied otherwise without departing from such principles.

We claim:

1. A filament cutting head for a trimmer, wherein the filament cutting head is rotatingly drivable about a rotational axis in operation, the filament cutting head comprising: a body that defines an interior region that is open to an area surrounding the housing, the body having a filament opening; at least one cutting filament insertable into and held in the housing so that the cutting filament extends from an outside of the body through the filament opening into the interior region of the body; a stop attached to the body so as to be in the interior region, wherein, in a first position of the cutting filament, the stop delimits a length of a filament portion of the cutting filament that extends into the interior region to an insertion length; and at least one deflection element arranged in the interior region of the body so that the filament portion of the cutting filament is bendable from the first position, without the cutting filament being displaced in a longitudinal direction of the cutting filament, into a second position in which the cutting filament abuts against the deflection element and the stop does not delimit the length of the filament portion which is inserted into the interior region.

2. The filament cutting head according to claim 1, wherein in the first position of the cutting filament, the filament portion of the cutting filament is aligned in a first direction, and the stop lies along the first direction, and in the second position of the cutting filament, the filament portion of the cutting filament is aligned in a second direction, wherein the stop lies outside a longitudinal axis of the filament portion of the cutting filament aligned in the second direction.

3. The filament cutting head according to claim 2, wherein, when viewed in a direction of the rotational axis, the deflection element is offset transversely with respect to the first direction in relation to the cutting filament.

4. The filament cutting head according to claim 2, wherein the filament portion in the first direction and the filament portion in the second direction enclose an angle of at least 5° around the rotational axis of the filament cutting head.

5. The filament cutting head according to claim 2, wherein the filament portion in the first direction and the filament portion in the second direction enclose an angle of at least 5° in a plane which includes the rotational axis and extends parallel to a longitudinal axis of the cutting filament.

6. The filament cutting head according to claim 1, wherein the filament opening has a lower opening edge in the interior region, and the deflection element has a support, wherein the cutting filament abuts against both the lower opening edge and the support in the second position.

7. The filament cutting head according to claim 6, wherein a distance measured in a direction of the rotational axis between the support and the lower opening edge is smaller than a height of the filament opening measured in the direction of the rotational axis.

8. The filament cutting head according to claim 6, wherein the support of the deflection element comprises a locking contour configured to secure the abutting cutting filament in the second position.

9. The filament cutting head according to claim 1, wherein a distance between the filament opening and the stop is no more than 10 times a diameter of the cutting filament.

10. The filament cutting head according to claim 1, wherein a distance between the filament opening and the stop is at least 3 times a diameter of the cutting filament.

11. The filament cutting head according to claim 1, further comprising a screening wall arranged in the interior region of the housing next to the cutting filament in a rotational direction of the rotational axis.

12. The filament cutting head according to claim 11, wherein the screening wall extends from the filament opening to the stop.

13. The filament cutting head according to claim 1, wherein the body has an underside which faces ground during operation, wherein the underside defines the interior region so that the interior region is open toward the surrounding area.

14. The filament cutting head according to claim 13, wherein a distance measured in a direction of the rotational axis between the underside and an inner end of the cutting filament is greater in the first position than in the second position.

15. The filament cutting head according to claim 1, wherein the deflection element is a ramp.

* * * * *